US009064508B1

(12) United States Patent
Shiimoto et al.

(10) Patent No.: US 9,064,508 B1
(45) Date of Patent: Jun. 23, 2015

(54) PILE SPIN-TORQUE OSCILLATOR WITH AF-MODE OSCILLATION FOR GENERATING HIGH AC-FIELD IN MICROWAVE-ASSISTED MAGNETIC RECORDING

(71) Applicant: HGST Netherlands B.V., Amsterdam (NL)

(72) Inventors: Masato Shiimoto, Odawara (JP); Masukaza Igarashi, Kawagoe (JP); Masashige Sato, Atsugi (JP)

(73) Assignee: HGST NETHERLANDS B.V., Amsterdam (NL)

( * ) Notice: Subject to any disclaimer, the term of this patent is extended or adjusted under 35 U.S.C. 154(b) by 0 days.

(21) Appl. No.: 14/217,157

(22) Filed: Mar. 17, 2014

(51) Int. Cl.
*G11B 5/187* (2006.01)

(52) U.S. Cl.
CPC ..................................... *G11B 5/187* (2013.01)

(58) Field of Classification Search
CPC ......... G11B 5/187; G11B 5/3146; H01F 7/00
USPC ....................... 360/125.3, 125.71, 324–324.2
See application file for complete search history.

(56) References Cited

U.S. PATENT DOCUMENTS

| 6,621,664 | B1 * | 9/2003 | Trindade et al. ............... 360/318 |
| 6,809,900 | B2 * | 10/2004 | Covington ............... 360/125.01 |
| 7,724,469 | B2 * | 5/2010 | Gao et al. ................... 360/125.3 |
| 8,208,219 | B2 | 6/2012 | Zhang et al. |
| 8,264,799 | B2 * | 9/2012 | Akiyama et al. ........... 360/324.1 |
| 8,274,811 | B2 | 9/2012 | Zhang et al. |
| 8,300,356 | B2 | 10/2012 | Zhang et al. |
| 8,488,373 | B2 | 7/2013 | Zhang et al. |
| 8,537,497 | B2 | 9/2013 | Nagasaka et al. |
| 8,553,362 | B2 * | 10/2013 | Tanabe et al. ............... 360/125.3 |
| 8,724,260 | B2 * | 5/2014 | Igarashi et al. ............ 360/125.3 |
| 8,724,261 | B2 * | 5/2014 | Suto et al. ................... 360/125.3 |
| 2008/0112087 | A1 * | 5/2008 | Clinton et al. ................ 360/317 |
| 2009/0180308 | A1 * | 7/2009 | Inomata et al. ............... 365/145 |
| 2011/0216436 | A1 | 9/2011 | Igarashi et al. |
| 2011/0293967 | A1 | 12/2011 | Zhang et al. |
| 2012/0176702 | A1 * | 7/2012 | Yamada et al. ............... 360/244 |
| 2013/0027803 | A1 | 1/2013 | Tanabe et al. |
| 2013/0070361 | A1 * | 3/2013 | Yang et al. ..................... 360/55 |
| 2013/0070367 | A1 | 3/2013 | Igarashi et al. |

OTHER PUBLICATIONS

Sato, Y. et al.; "Thin Spin-torque Oscillator With High AC Field for High Density Microwave-Assisted Magnetic Recording," IEEE Transaction on Magnetics; vol. 49, No. 7; Jul. 2013.

* cited by examiner

*Primary Examiner* — Angel Castro
(74) *Attorney, Agent, or Firm* — Patterson & Sheridan, LLP

(57) ABSTRACT

The present disclosure generally relates to a structure for a perpendicular microwave-assisted magnetic recording head used in a magnetic disk drive. A first spin-torque oscillator and a second spin-torque oscillator are positioned between the main pole of a recording head and a trailing shield, and are separated by a spin torque shield layer. The first spin-torque oscillator comprises a first magnetic layer, a first non-magnetic interlayer, and a second magnetic layer. The second spin-torque oscillator comprises a third magnetic layer, a second non-magnetic interlayer, and a fourth magnetic layer. An applied current is adapted to flow in a direction from the second magnetic layer to the first magnetic layer, and from the fourth magnetic layer to the third magnetic layer.

13 Claims, 10 Drawing Sheets

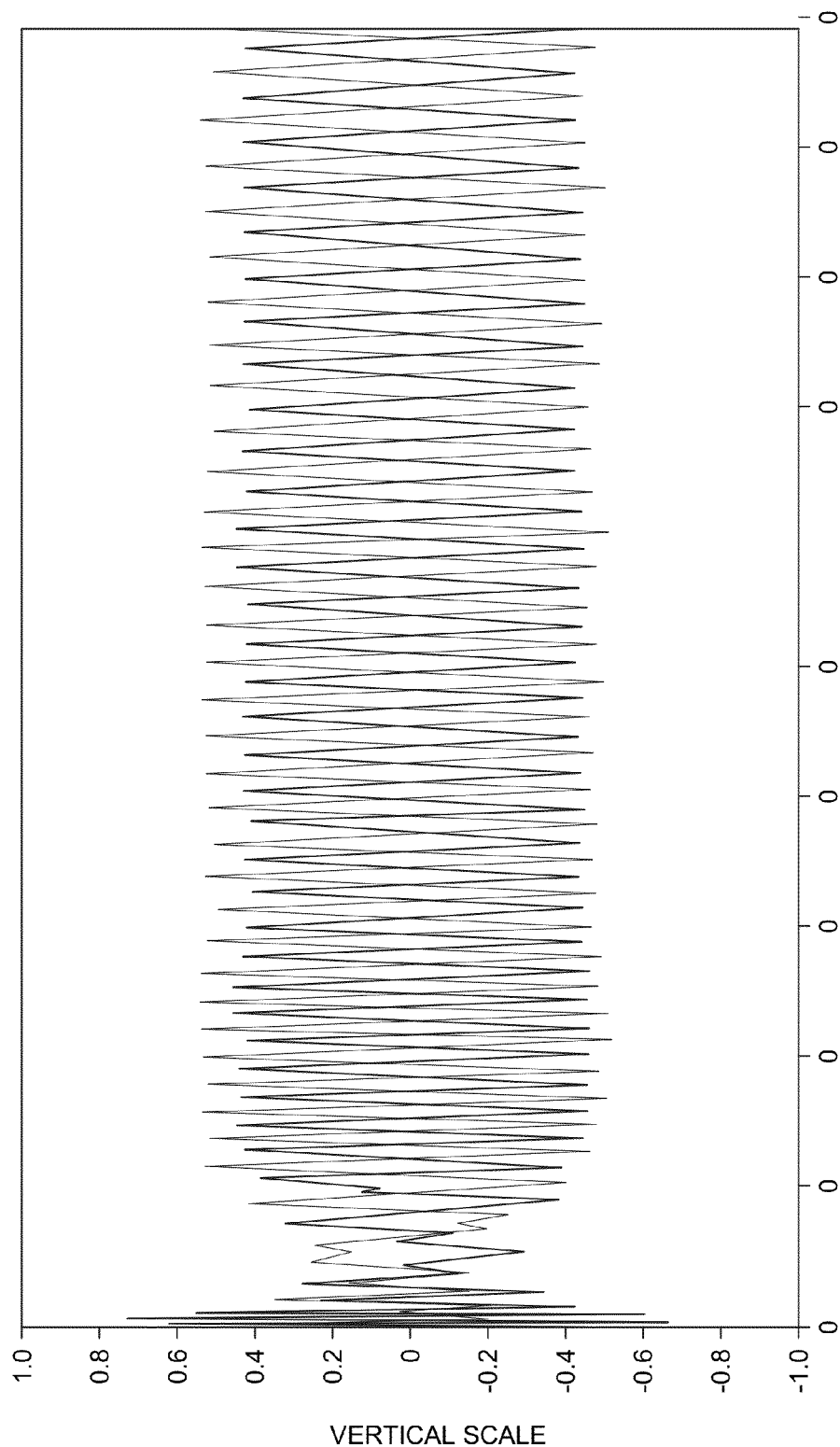

PILE SPIN-TORQUE OSCILLATOR WITH AF-MODE OSCILLATION FOR GENERATING HIGH AC-FIELD IN MICROWAVE-ASSISTED MAGNETIC RECORDING

BACKGROUND OF THE INVENTION

1. Field of the Invention

Embodiments disclosed herein generally relate to a structure for a perpendicular magnetic recording head used in a magnetic disk device.

2. Description of the Related Art

Investigations have been carried out in recent years into microwave-assisted magnetic recording (MAMR) as a recording method for increasing recording density. In MAMR, an AC magnetic field from a spin-torque oscillator (STO) is applied to a medium in addition to the magnetic field from a main pole. When the AC field is applied to the medium, the coercive force of the medium decreases, and high-quality recording is readily achieved. It is therefore important in MAMR to develop an STO that can generate a sufficiently large AC field. The STO 100 in FIG. 1 comprises a field generation layer (FGL) 102 for generating an AC field, an interlayer or spacer 104, and a spin polarization layer (SPL) 106 for transmitting spin-polarized torque.

A material having strong perpendicular anisotropy energy is used for the SPL 106. Furthermore, the STO 100 is energized with current in the direction from the SPL 106 to the FGL 102 as shown by arrow "A". In this process, spin torque in the same direction as the magnetization of the FGL 102 acts on the magnetization of the SPL 106, and spin torque acts on the magnetization of the FGL 102 in a direction which is anti-parallel with the magnetization of the SPL 106. Furthermore, a perpendicular magnetic field is applied to the STO 100, and therefore the magnetization of the SPL 106 is stable in the perpendicular direction as shown by arrow "B". On the other hand, the FGL 102 magnetization shown by arrow "C" oscillates with a large in-plane component 108. Oscillation of the STO 100 in this structure is referred to as T-mode oscillation because the SPL 106 and FGL 102 oscillate in a "T"-shape.

As shown in FIG. 2, the STO 200 structure also comprises an FGL 102 for generating an AC field, an interlayer or spacer 104, and an SPL 106 for transmitting spin-polarized torque. The difference in FIG. 2 lies in the fact that the magnetization of the SPL 106 is effectively in the film in-plane direction as shown by arrow "D", and both the FGL 102 and SPL 106 oscillate. According to the specific structure which is used, an energizing current flows in the direction from the FGL 102 to the SPL 106 as shown by arrow "E", and the SPL 106 is thin and the perpendicular anisotropy field is low, so that the effective anisotropy field of the SPL 106 is zero. A feature of this structure lies in the fact that there is no delay in reversal of the magnetization of the SPL 106 due to switching of the current polarity of the write head field, so reversal of the FGL 102 also occurs rapidly which is advantageous for high-speed transfer recording. When the STO 200 oscillates, a state in which the SPL 106 and FGL 102 are anti-parallel is maintained, and is therefore referred to as antiferromagnetic-mode (AF-mode) oscillation.

A feature required of an STO is to increase the generated AC field, and to this end it is effective to increase the spin torque acting on the FGL. The magnitude of the spin torque is proportional to the density of the current to the STO, and therefore a high AC field intensity can be achieved by increasing the applied current. FIG. 3 shows the relationship between AC field intensity and amount of current applied in an STO structure where the FGL film thickness is 7.5 nm and 15 nm. FIG. 4 and FIG. 5 show the state of magnetization when an STO 400, 500 having an FGL 102 with a film thickness of 7.5 nm and 15 nm, respectively, is seen from the surface opposite the medium. The state of magnetization is the result of a numerical value calculation in a micro-magnetic simulation. The energizing current to the STO 400, 500 is 9 mA. It is clear from FIG. 3 that the AC field intensity is increased as a result of an increase in the energizing current to the STO, and saturation is reached. Furthermore, the saturation value of the AC field intensity is largely unchanged for an STO in which the FGL film thickness is 7.5 nm or 15 nm. This is because, as is clear from FIG. 4 and FIG. 5, the in-plane component of the FGL magnetization is attenuated by a greater amount further away from the spacer interface. This can be explained by the fact that the FGL magnetization distribution shown by arrows "F" and "G" is believed to become weaker further away from the spacer interface while the spin torque acting on the FGL 102 is most intense in the region of the spacer interface, as seen in FIG. 5. Furthermore, saturation of the AC field intensity means that the spin torque of the FGL 102 is excessively intense in the region of the spacer interface, so the FGL magnetization is disturbed and multiple magnetic domains are produced, whereas the increase in the film-plane component of the FGL magnetization is small at a position remote from the spacer interface. This means that a simple increase in FGL film thickness cannot be considered an effective solution for increasing the AC field intensity.

Therefore, there is a need in the art for an STO having an increased AC field intensity.

SUMMARY OF THE INVENTION

The present disclosure generally relates to a structure for a perpendicular microwave-assisted magnetic recording head used in a magnetic disk drive. A first spin-torque oscillator and a second spin-torque oscillator are positioned between the main pole of a recording head and a trailing shield, and are separated by a spin torque shield layer. The first spin-torque oscillator comprises a first magnetic layer, a first non-magnetic interlayer, and a second magnetic layer. The second spin-torque oscillator comprises a third magnetic layer, a second non-magnetic interlayer, and a fourth magnetic layer. An applied current is adapted to flow in a direction from the second magnetic layer to the first magnetic layer, and from the fourth magnetic layer to the third magnetic layer.

In one embodiment, a microwave-assisted magnetic recording head comprises a main pole and a trailing shield, a first spin-torque oscillator, a second spin-torque oscillator, and a spin torque shield layer interposed between the first spin-torque oscillator and the second spin-torque oscillator. The first spin-torque oscillator comprises a first magnetic layer, a first non-magnetic interlayer disposed on the first magnetic layer, and a second magnetic layer disposed on the first non-magnetic interlayer. The second spin-torque oscillator comprises a third magnetic layer, a second non-magnetic interlayer disposed on the third magnetic layer, and a fourth magnetic layer disposed on the second non-magnetic interlayer. An applied current is adapted to flow in a direction from the second magnetic layer to the first magnetic layer, and from the fourth magnetic layer to the third magnetic layer.

In another embodiment, the microwave-assisted magnetic recording head comprises a main pole and a trailing shield, a first spin-torque oscillator, a second spin-torque oscillator, and spin torque shield layer. The first spin-torque oscillator comprises a first spin polarization layer on the main pole, a first non-magnetic spacer layer disposed on the first spin polarization layer, and a first field generation layer disposed on the first spacer layer. The second spin-torque oscillator comprises a second spin polarization layer, a second non-magnetic spacer layer disposed on the second spin polarization layer, and a second field generation layer disposed between the second spacer layer and the trailing shield. The spin torque shield layer is interposed between the first field generation layer of the first spin-torque oscillator and the second field generation layer of the second spin-torque oscillator. An applied current is adapted to flow in a direction from the second field generation layer to the first spin polarization layer, and wherein when the current is applied, a spin torque of the first field generation layer is anti-parallel in direction to the spin torque of the first spin polarization layer, the spin torque of the second field generation layer is anti-parallel in direction to the spin torque of the second spin polarization layer, and the first field generation layer and the second spin polarization layer are anti-ferromagnetically coupled.

In another embodiment, the microwave-assisted magnetic recording head comprises a main pole and a trailing shield, a first spin-torque oscillator, a second spin-torque oscillator, and spin torque shield layer. The first spin-torque oscillator comprises a first field generation layer on the main pole, a first non-magnetic spacer layer disposed on the first field generation layer, and a first spin polarization layer disposed on the first spacer layer. The second spin-torque oscillator comprises a second field generation layer, a second non-magnetic spacer layer disposed on the second field generation layer, and a second spin polarization layer disposed between the second spacer layer and the trailing shield. The spin torque shield layer is interposed between the first spin polarization layer of the first spin-torque oscillator and the second field generation layer of the second spin-torque oscillator. An applied current is adapted to flow in a direction from the first field generation layer to the second spin polarization layer, and wherein when the current is applied, a spin torque of the first field generation layer is anti-parallel in direction to the spin torque of the first spin polarization layer, and the spin torque of the second field generation layer is anti-parallel in direction to the spin torque of the second spin polarization layer.

BRIEF DESCRIPTION OF THE DRAWINGS

So that the manner in which the above recited features can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIGS. 6A and 6B show magnetization vs. time for two FGL structures.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

The present disclosure generally relates to a structure for a perpendicular microwave-assisted magnetic recording head used in a magnetic disk drive. A first spin-torque oscillator and a second spin-torque oscillator are positioned between the main pole of a recording head and a trailing shield, and are separated by a spin torque shield layer. The first spin-torque oscillator comprises a first magnetic layer, a first non-magnetic interlayer, and a second magnetic layer. The second spin-torque oscillator comprises a third magnetic layer, a second non-magnetic interlayer, and a fourth magnetic layer. An applied current is adapted to flow in a direction from the second magnetic layer to the first magnetic layer, and from the fourth magnetic layer to the third magnetic layer.

Figures 1, 2:
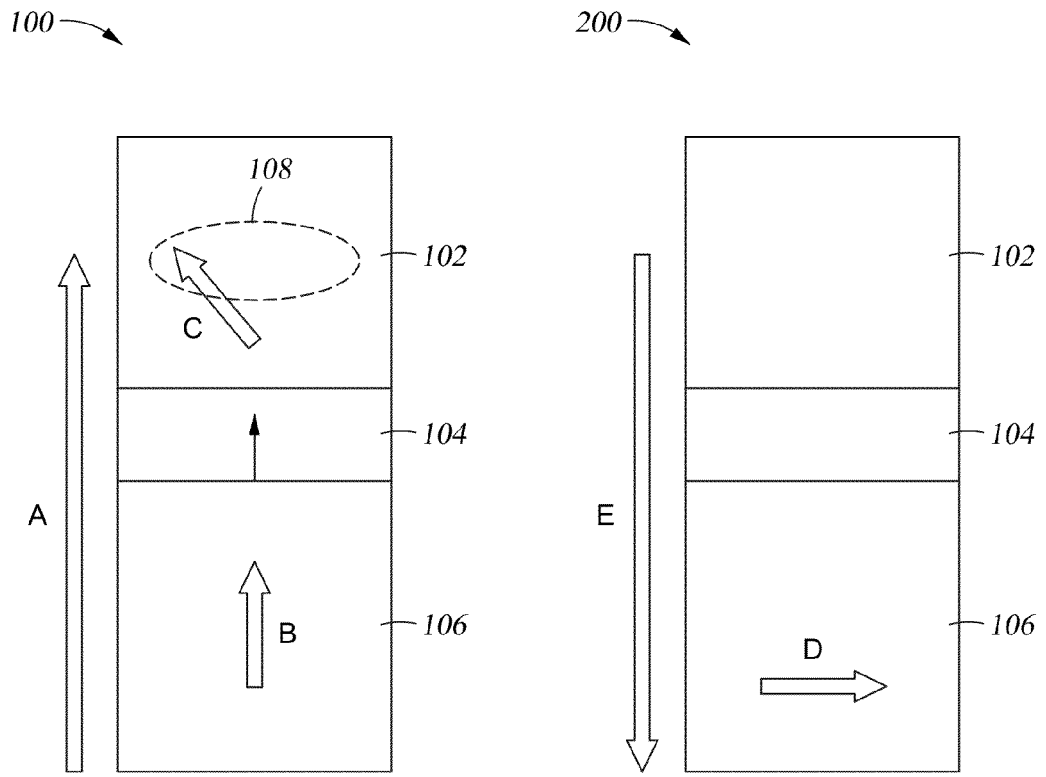
FIG. 1 shows a prior art T-mode STO structure.
FIG. 2 shows a prior art AF-mode STO structure.
Figure 3:
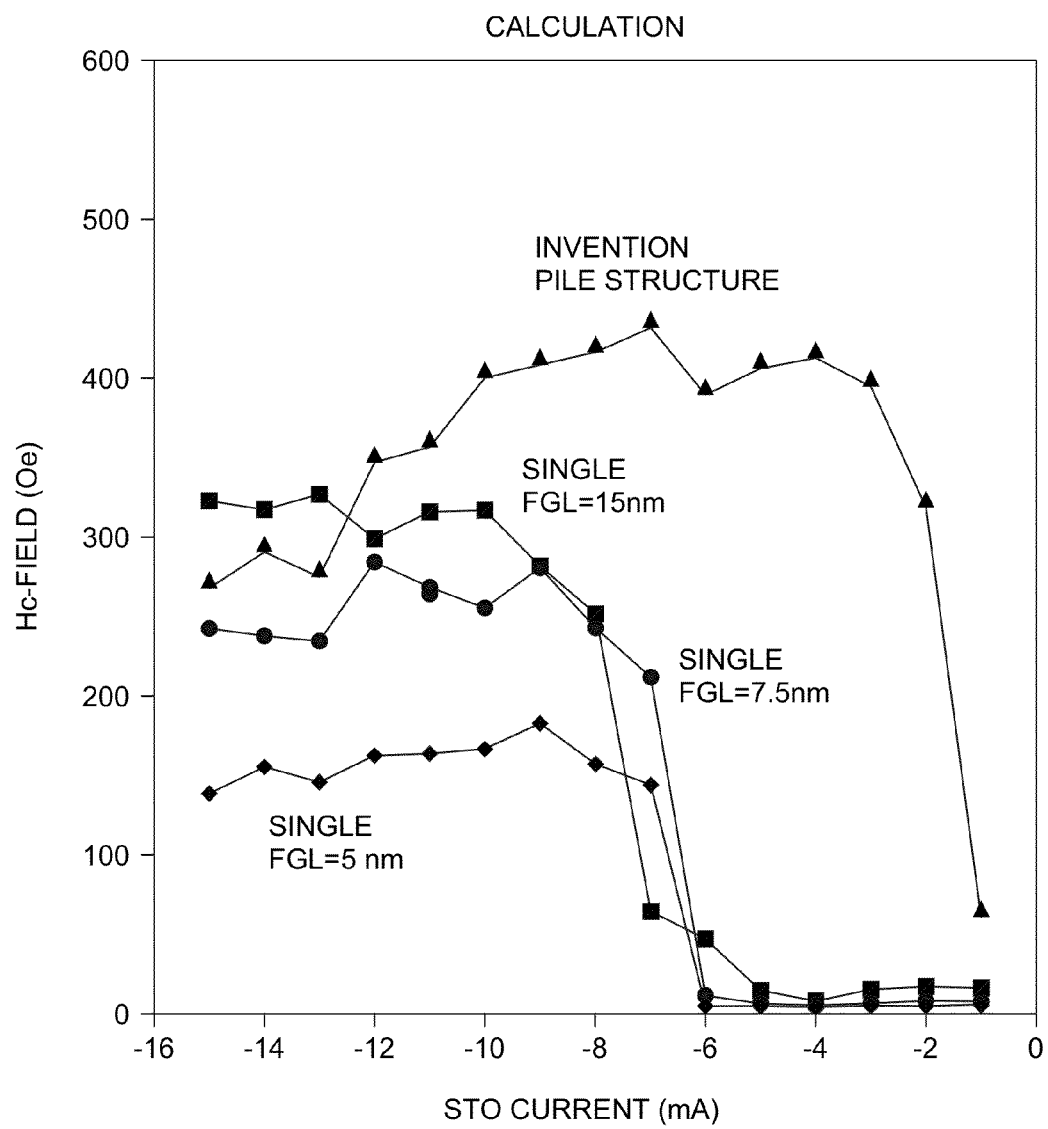
FIG. 3 shows AC-field vs. STO current for conventional STOs.
Figures 4, 5:
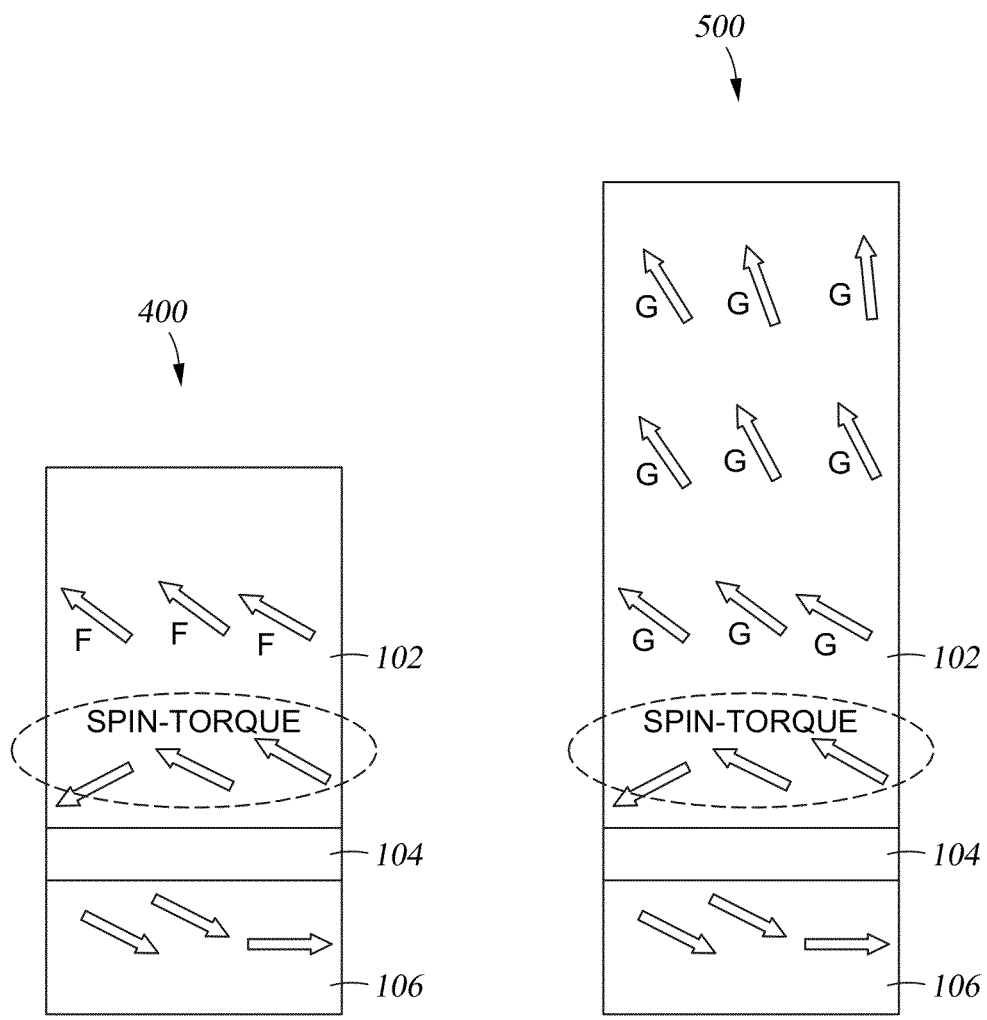
FIG. 4 shows magnetization configuration for a prior art STO.
FIG. 5 shows magnetization configuration for a prior art STO.
Figure 6A:
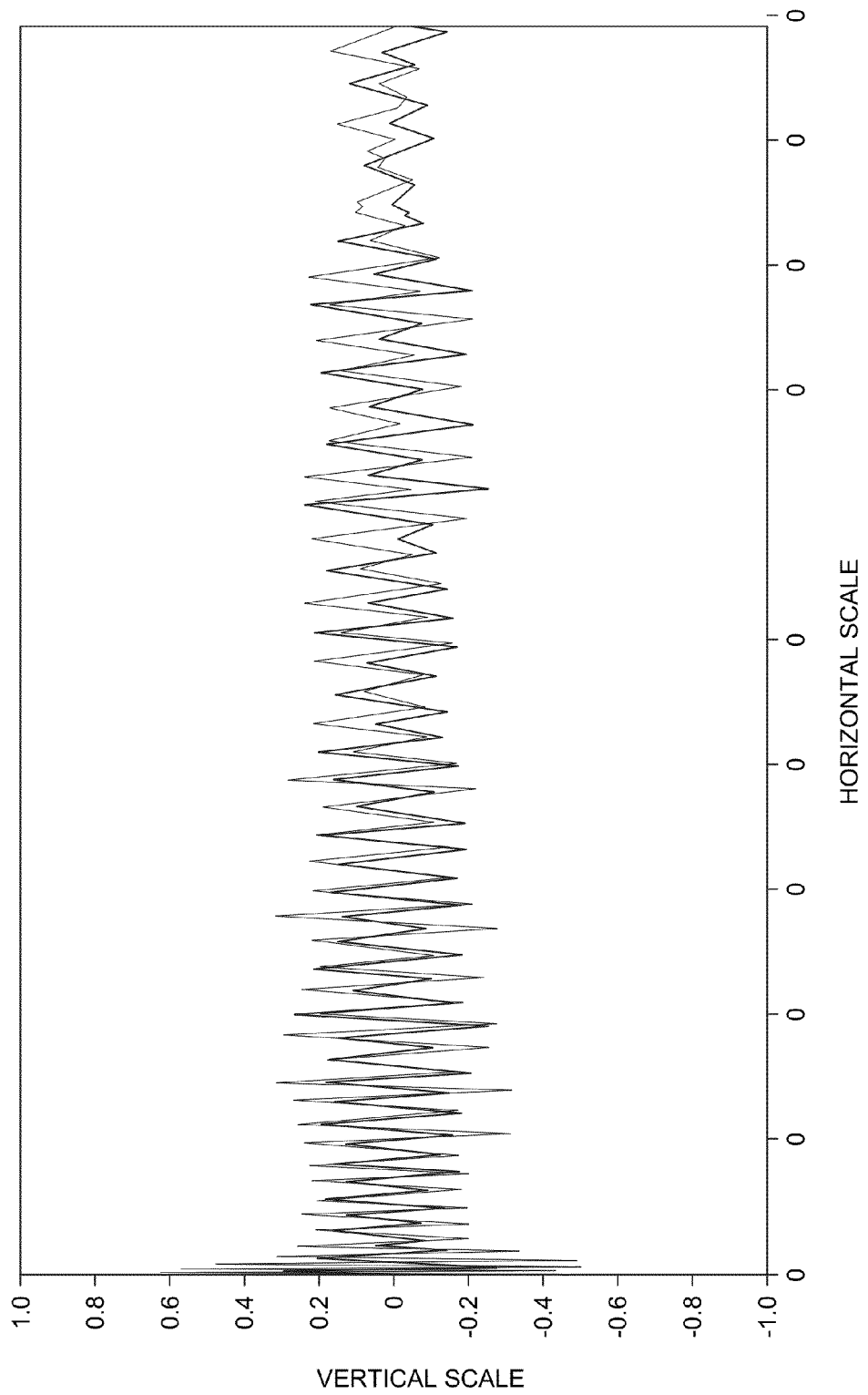

The AC field enhancing effect of the STO according to the present invention will be explained. FIG. 6A shows changes over time of the film in-plane component of the magnetization of the FGL 702 and FGL 708 in an STO employing an exemplary structure with AF-coupling according to one embodiment. According to this exemplary structure, the distance between the FGL 1 and FGL 2 is 6 nm, the StSL 920 is made of Ru, and the film thickness is 8 Å. It is clear from FIG. 6A that the FGL 702 and FGL 708 oscillate completely synchronously and the oscillation of each FGL is also stable. FIG. 6B shows changes over time of the film in-plane component of the magnetization of the FGL 702 and FGL 708 in an STO employing an exemplary structure with ferromagnetic coupling. FIG. 6B shows the FGL 702 and FGL 708 do not oscillate completely synchronously, but oscillate with a half phase shift.

Figure 7A:
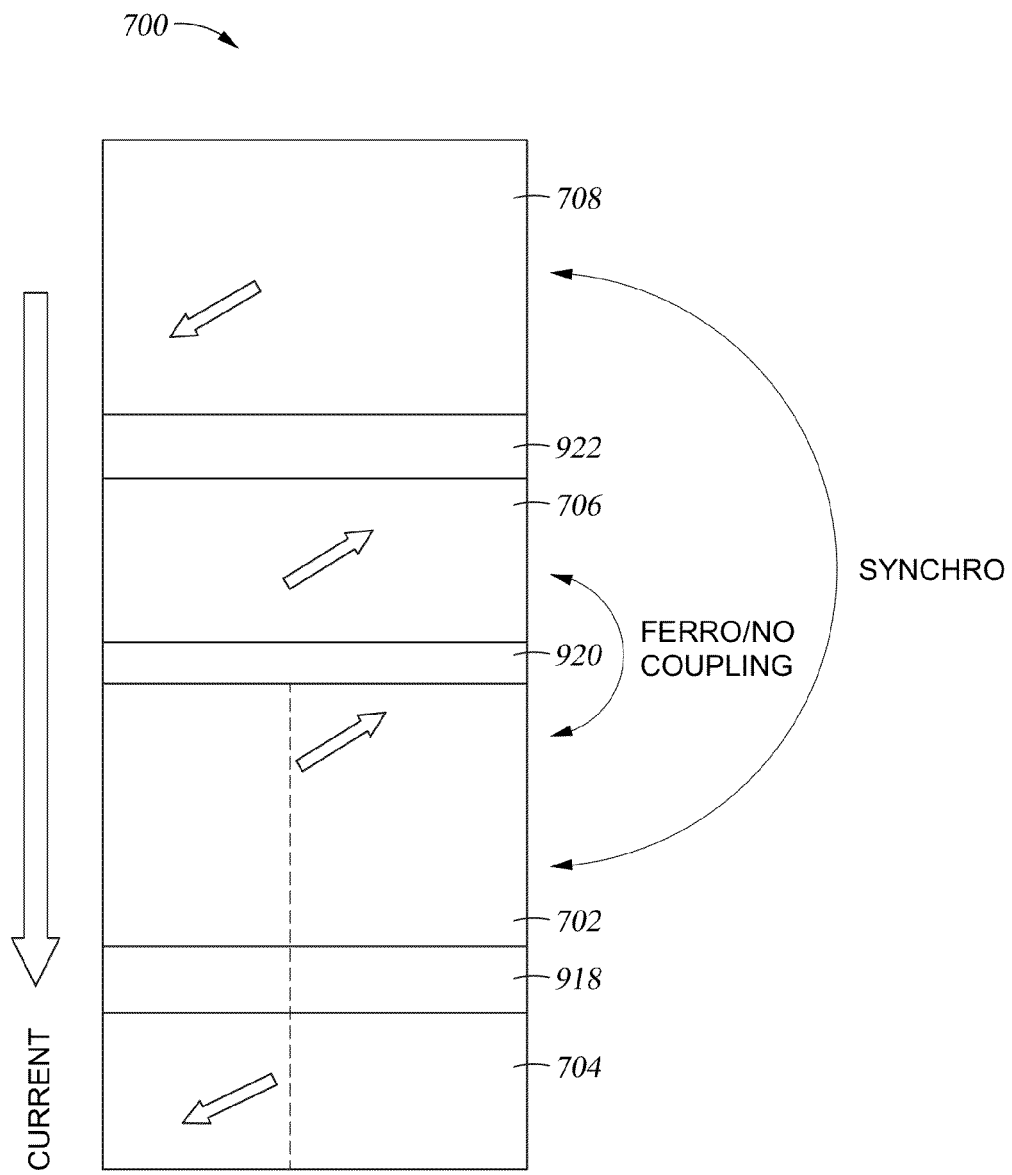
FIGS. 7A and 7B show an STO structure according one embodiment.

The reason why the FGL 702 and FGL 708 can be synchronous will be explained with the aid of FIG. 7A. In an AF-mode STO, the SPL is thinner than the FGL and the current is applied from the FGL in the direction of the SPL, and as a result the SPL and FGL are subjected to spin torque in an anti-parallel direction. Consequently, as shown in FIG. 7A, the FGL 702 and SPL 704, and the FGL 708 and SPL 706 are oriented in anti-parallel directions. In addition, by controlling the material and thickness of the StSL between the FGL 702 and SPL 706, it is possible to produce an anti-parallel state between the FGL 702 and the SPL 706. The FGL 702 and SPL 708 attempt to turn in directions parallel to each other when spin torque passes through, and therefore Ru or Rh which readily blocks spin torque is used as the material thereof. Furthermore, the film thickness of the StSL is controlled in a range in which anti-parallel coupling is produced.

Figure 7B:
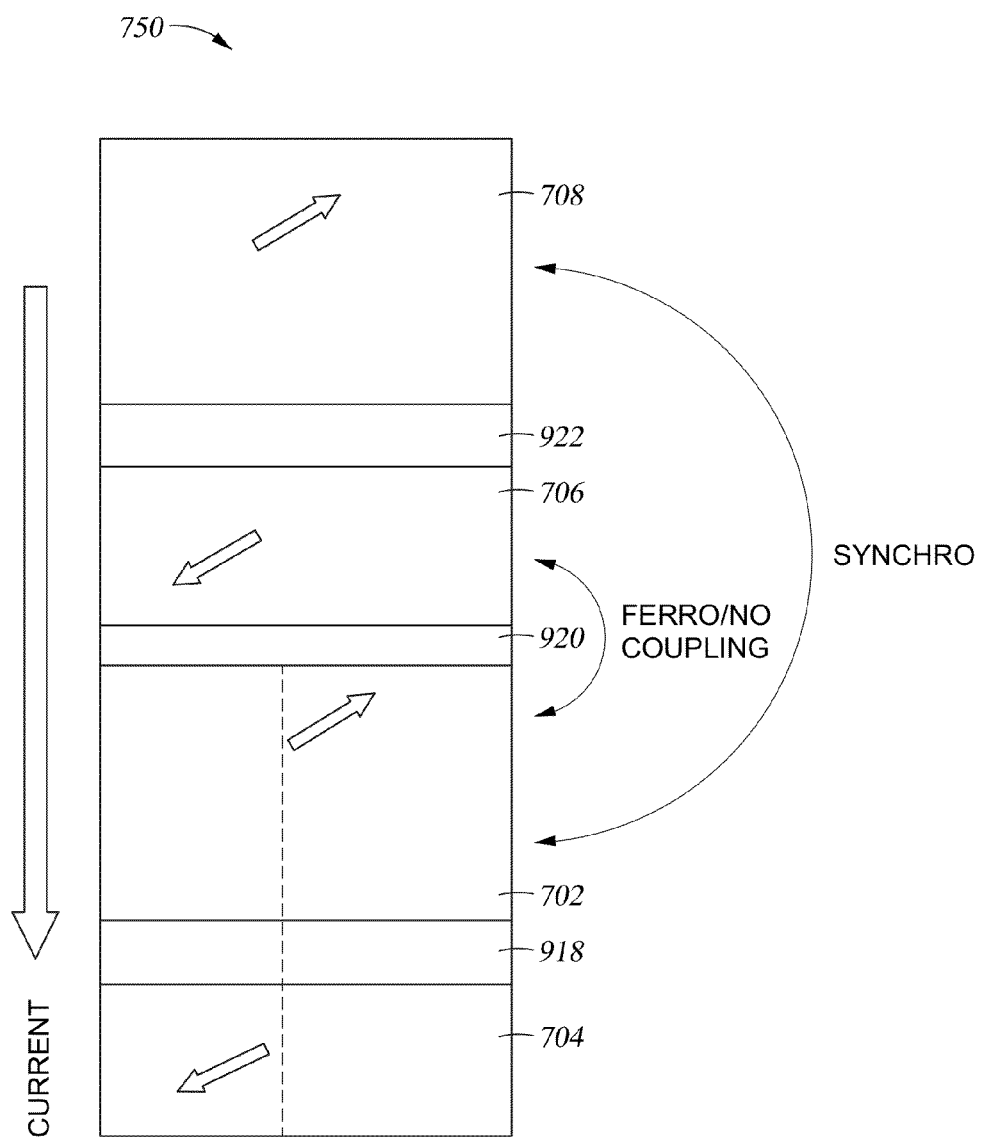

FIG. 7B shows the STO 750 employed in FIG. 6B. In FIG. 7B, the FGL 702 and FGL 708, and the SPL 704 and SPL 706 are oriented in anti-parallel directions, resulting in ferromagnetic coupling between the STO 752 and STO 754.

Figure 8:
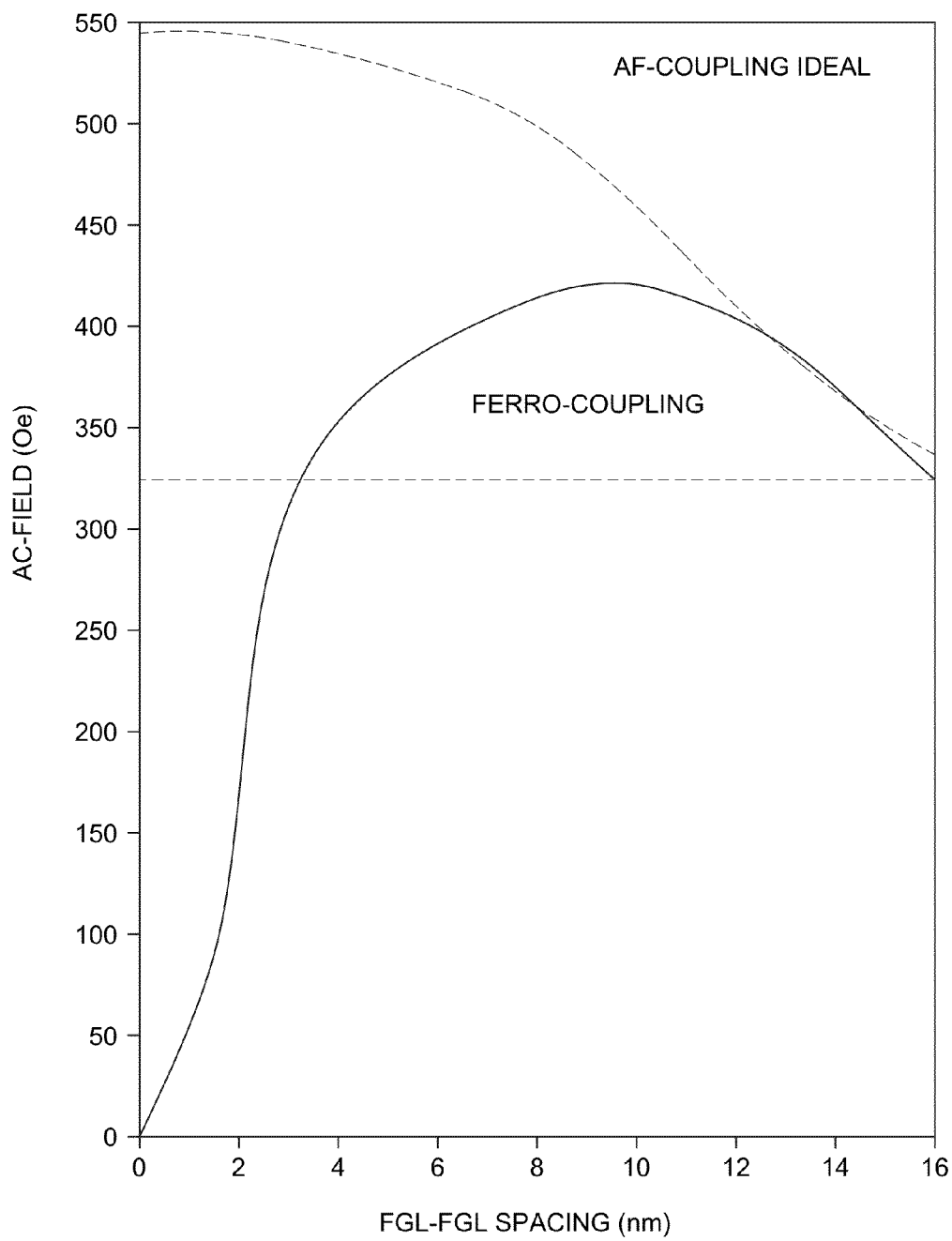
FIG. 8 shows AC-field vs. FGL-FGL distance.

FIG. 8 shows the relationship between AC field intensity and the distance between FGL 702 and FGL 708 in an STO in which the film thickness of the StSL is 8 Å and 11 Å. An STO having the structure of a distance between the FGL 702 and FGL 708 equaling 6 nm, a StSL made of Ru, and a film thickness equaling 8 Å has an AC field intensity of 520 Oe. This is far greater than the 300 Oe AC field intensity which can be produced by a conventional single-layer STO.

Figure 9:
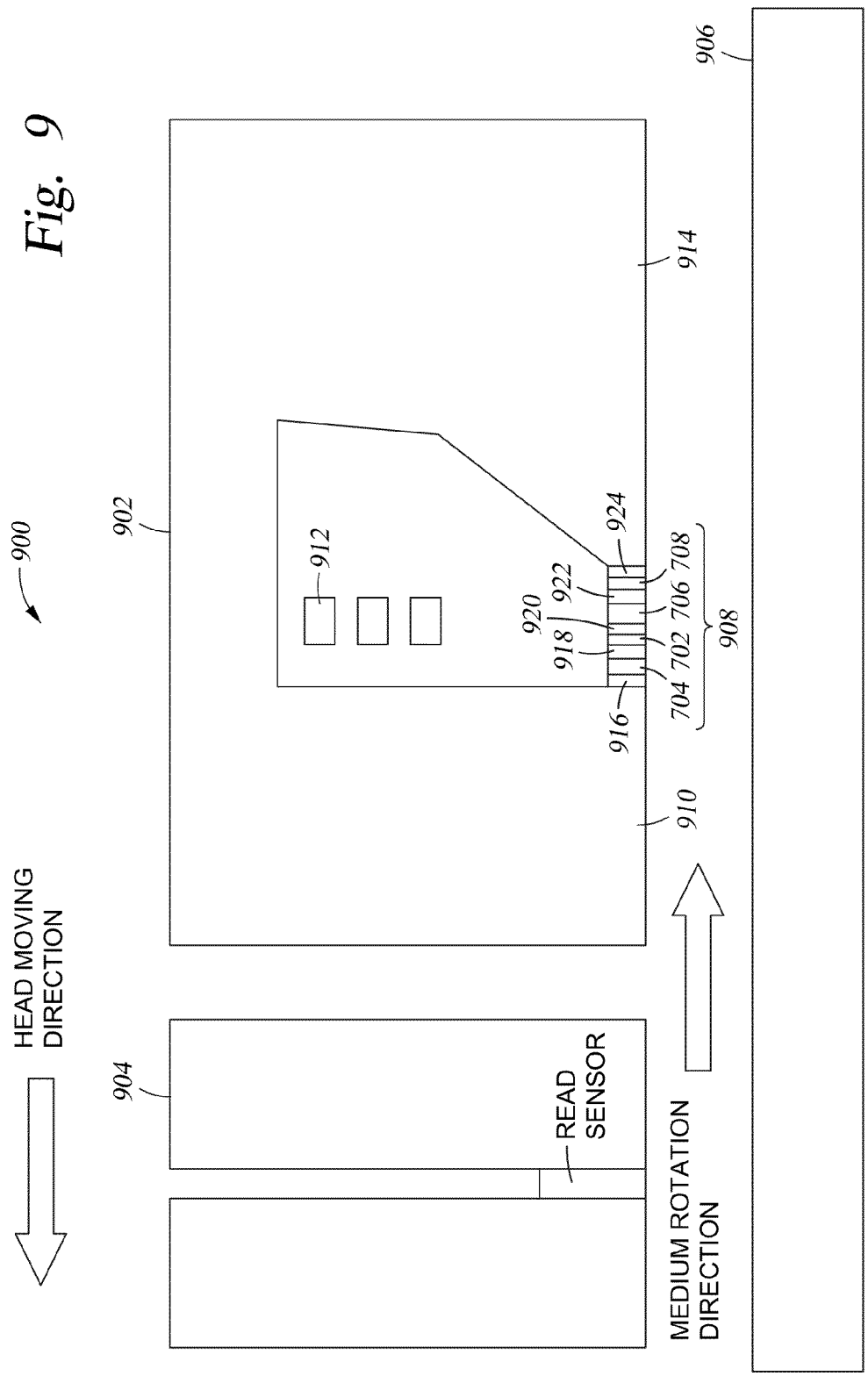
FIG. 9 shows a MAMR head structure according to one embodiment.

An exemplary structure of the present invention is shown in detail in FIG. 9. A magnetic recording/reproduction head 900 comprises a recording head (writer) 902 and a reproduction head (reader) 904. The reproduction head 902 needs to be able to reproduce information recorded on a magnetic recording medium 906. The recording head 902 comprises an STO 908 for generating an AC field, a main pole 910 for generating a recording head field, a coil 912 for exciting a magnetic field in the main pole 910, and a trailing shield 914. A side shield may be provided outside the main pole in the track width direction, although this is not shown in FIG. 9.

The recording head 902 according to an embodiment of the present invention will be described below in detail. The structure of the STO 908 is shown in FIGS. 7A and 7B. The STO 908 comprises, in succession from the main pole side: an underlayer 916, an SPL 704, a non-magnetic interlayer 918, and FGL 702, a spin torque shield layer 920, and SPL 706, a non-magnetic interlayer 922, an FGL 708, and a cap layer 924. In this example, the underlayer 916 may comprise tantalum and have a thickness of up to about 2 nm The cap layer 924 may comprise chromium and have a thickness of up to about 2 nm. The non-magnetic interlayers 918, 922 may comprise copper and have a thickness of up to about 2 nm. The current energization direction in the STO 908 is from the FGL 708 toward the SPL 704, and the current energization direction is from the trailing shield 914 toward the FGL 708. In one embodiment, a conductive non-magnetic material may be used for the underlayer 916, cap layer 924, and non-magnetic interlayers 918, 922, and single metals such as Ta, Cr, Cu, Pt, Ag, Rh and Ru or laminates thereof may be used. The same material of the same thickness is preferably used for the non-magnetic interlayers 918, 922, but it is contemplated that the materials and thicknesses may be different provided that equivalent magnetic characteristics can be achieved by the two different STOs. Furthermore, the track width and element height of the STO 908 may be about 40 nm in each case. The main pole 910 may comprise a CoFe alloy, the saturation magnetization (Ms) may be about 2.4 T, the track width may be about 60 nm, and the film thickness may be about 300 nm. The trailing shield 914 may comprise a NiFe alloy and the Ms may be about 1.2 T. There are no particular limitation to the geometric dimensions of the STO and recording head, and the dimensions may be freely set in such a way that a high field intensity and field gradient are achieved from the STO and recording head.

The FGL 702 and FGL 708 in this example may comprise 7 nm of Co50Fe50. The saturation magnetization of Co50Fe50 is 2.4 T. A material having high spin-polarizability (P) and saturation magnetization (Ms) can generate a higher AC field. For the FGL, it is possible to use a multilayer film comprising an alloy such as $Co_2MnGe$ which is a Heusler alloy other than CoFe, or [Co/Fe]n, or a perpendicular anisotropy film such as Co/Ni. SPL 704 and SPL 706 are both Co/Ni for which the saturation magnetization is 1.2 T, the perpendicular anisotropy field is 12 kOe, and the film thickness is about 3.2 nm. The material of the SPL is a magnetic material which preferably has high polarizability, but otherwise has no particular limitation. It is possible to use a material having a high Bs such as Co50Fe50, or a material having a low Bs such as Ni for the SPL. Furthermore, it is also possible to use a material having high polarizability such as a Heusler alloy for the SPL. The spin torque shield layer (StSL) 920 which is inserted between the two STOs comprises Rh or Ru. In one embodiment, Ru having a film thickness of about 8 Å may be used. The StSL 920 restricts spin torque interactions between the SPL 706 and the FGL 702, and therefore Rh or Ru is preferred. Furthermore, the fact that the SPL 706 and FGL 702 are antiferromagnetically coupled is effective for producing synchronous oscillation of the FGL 702 and FGL 708, and therefore the film thickness may be set at between 3 Å and 10 Å.

By virtue of the configuration described above, the distance between the FGL 702 and FGL 708 is about 6 nm, and it is clear from FIG. 8 that the AC field intensity is of the order of 520 Oe. This is greater than the 300 Oe field intensity which can be produced by a single-layer STO. The shorter the distance between the FGL 702 and FGL 708, the greater the AC field, but the distance between the FGL 702 and FGL 708 is essentially the total thickness of the StSL 920, SPL 706 and spacer 922. Therefore, the limit to which the film thickness can be reduced while the characteristics of the STO are maintained is around 3 nm. Meanwhile, if the distance between the FGL 702 and FGL 708 increases, the AC field intensity decreases, and the AC field is essentially equal to that of a single-layer STO when this distance reaches 15 nm. According to the embodiments discussed herein, the film thicknesses of the StSL 920, SPL 706 and spacer 922 are therefore controlled in such a way that the distance between the FGL 702 and FGL 708 is between 3 nm and 15 nm, and as a result it is possible to achieve a considerable effect of increasing the AC field.

Figure 10:
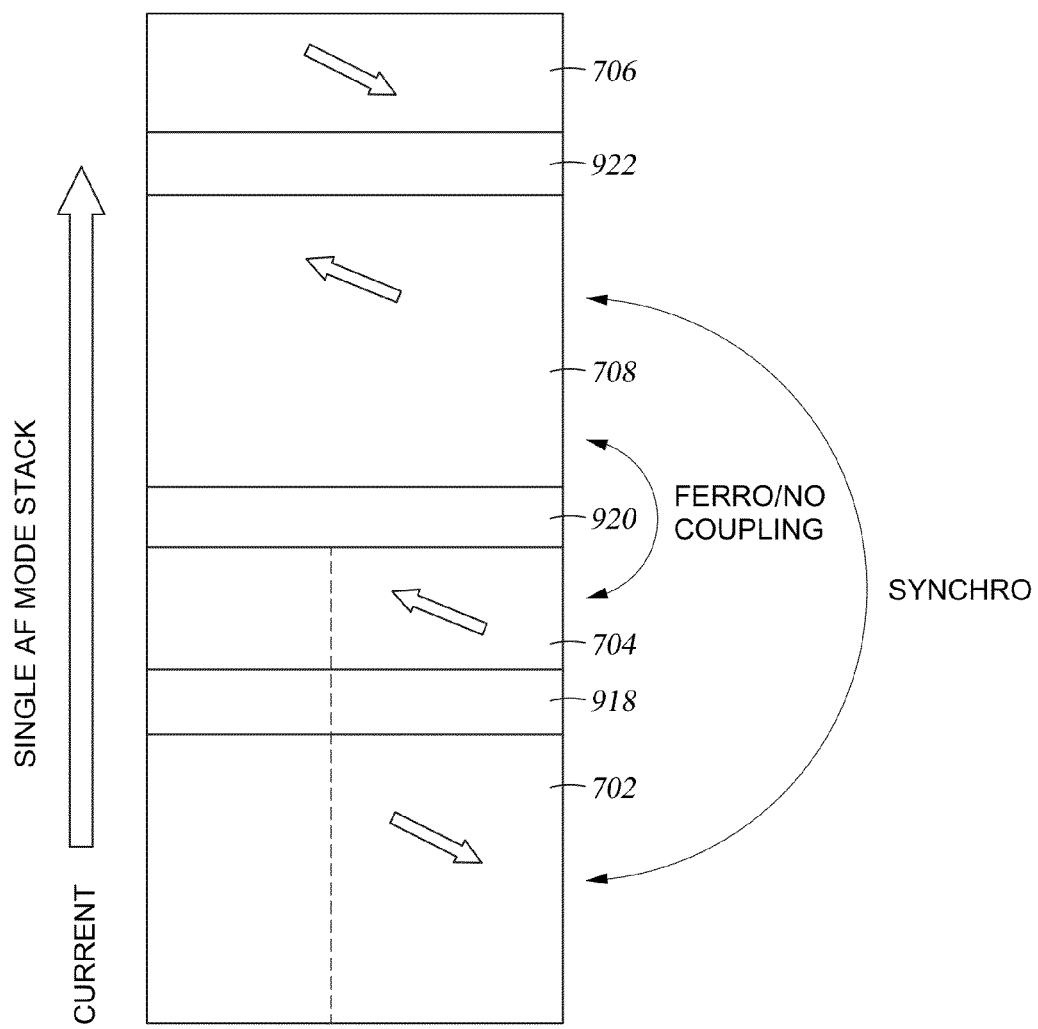
FIG. 10 shows an STO structure according to another embodiment.

Another embodiment will be described below. This embodiment differs from the previous embodiment in the order of stacking in the STO. Specifically, the STO has the structure shown in FIG. 10, with the following order stacked from the main pole: underlayer 916, FGL 702, spacer 918, SPL 704, StSL 920, FGL 708, spacer 922, SPL 706, and capping layer 924. The thickness and material of each layer may be as discussed above as in the first embodiment. The current flows from the FGL 702 in the direction of the SPL 704, and therefore the current direction is from the main pole 910 to the trailing shield 914, which is the only difference between the two embodiments. In this embodiment, the spacer 918, SPL 704, and StSL 920 are at essentially the same distance as the FGL 702 and FGL 708, and therefore the total thickness thereof is controlled in such a way as to lie between 3 nm and 15 nm, and as a result it is possible to achieve a considerable effect of increasing the AC field.

Therefore, a multilayer STO having, essentially, two STOs spaced apart by a spin torque shield layer increases the AC field intensity.

While the foregoing is directed to embodiments of the present invention, other and further embodiments of the invention may be devised without departing from the basic scope thereof, and the scope thereof is determined by the claims that follow.

What is claimed is:

1. A microwave-assisted magnetic recording head having a main pole and a trailing shield, comprising:
   a first spin-torque oscillator comprising a first magnetic layer, a first non-magnetic interlayer disposed on the first magnetic layer, and a second magnetic layer disposed on the first non-magnetic interlayer;
   a second spin-torque oscillator comprising a third magnetic layer, a second non-magnetic interlayer disposed on the third magnetic layer, and a fourth magnetic layer disposed on the second non-magnetic interlayer; and
   a spin torque shield layer interposed between the first spin-torque oscillator and the second spin-torque oscillator, wherein an applied current is adapted to flow in a direction from the second magnetic layer to the first magnetic layer, and from the fourth magnetic layer to the third magnetic layer, wherein the spin torque shield layer comprises Ru or Rh.

2. The microwave-assisted magnetic recording head of claim 1, wherein the layer thickness of the first magnetic layer is less than the layer thickness of the second magnetic layer, and the layer thickness of the third magnetic layer is less than the layer thickness of the fourth magnetic layer.

3. The microwave-assisted magnetic recording head of claim 1, wherein the distance between the second magnetic layer and the fourth magnetic layer is between 3 nm and 15 nm.

4. The microwave-assisted magnetic recording head of claim 1, wherein the spin torque shield layer is less than about 3 nanometers thick.

5. The microwave-assisted magnetic recording head of claim 1, wherein the material and the layer thickness of the first magnetic layer and the third magnetic layer are the same, and the material and layer thickness of the second magnetic layer and the fourth magnetic layer are the same.

6. The microwave-assisted magnetic recording head of claim 1, wherein the layer thickness of the second magnetic layer and the fourth magnetic layer are under 10 nanometers.

7. A microwave-assisted magnetic recording head having a main pole and a trailing shield, comprising:
   a first spin-torque oscillator comprising a first spin polarization layer on the main pole, a first non-magnetic spacer layer disposed on the first spin polarization layer, and a first field generation layer disposed on the first non-magnetic spacer layer;
   a second spin-torque oscillator comprising a second spin polarization layer, a second non-magnetic spacer layer disposed on the second spin polarization layer, and a second field generation layer disposed between the second non-magnetic spacer layer and the trailing shield; and
   a spin torque shield layer interposed between the first field generation layer of the first spin-torque oscillator and the second field generation layer of the second spin-torque oscillator; wherein an applied current is adapted to flow in a direction from the second field generation layer to the first spin polarization layer, and wherein when the current is applied:
      a spin torque of the first field generation layer is anti-parallel in direction to the spin torque of the first spin polarization layer, and the spin torque of the second field generation layer is anti-parallel in direction to the spin torque of the second spin polarization layer; and
      the first field generation layer and the second spin polarization layer are anti-ferromagnetically coupled.

8. The microwave-assisted magnetic recording head of claim 7, wherein the layer thickness of the first spin polarization layer is less than the layer thickness of the first field generation layer, and the layer thickness of the second spin polarization layer is less than the layer thickness of the second field generation layer.

9. The microwave-assisted magnetic recording head of claim 7, wherein the distance between the first field generation layer and the second field generation layer is between 3 nm and 15 nm.

10. The microwave-assisted magnetic recording head of claim 7, wherein the spin torque shield layer comprises Ru or Rh.

11. The microwave-assisted magnetic recording head of claim 7, wherein the spin torque shield layer is less than about 2 nanometers thick.

12. The microwave-assisted magnetic recording head of claim 7, wherein the material and the layer thickness of the first spin polarization layer and the second spin polarization layer are the same, and the material and layer thickness of the first field generation layer and the second field generation layer are the same.

13. The microwave-assisted magnetic recording head of claim 7, wherein the layer thickness of the first field generation layer and the second field generation layer are under 10 nanometers.

* * * * *